(12) United States Patent
Hwang et al.

(10) Patent No.: US 10,674,534 B2
(45) Date of Patent: Jun. 2, 2020

(54) METHOD FOR REPORTING CHANNEL STATUS INFORMATION ON LICENSE ASSISTED ACCESS BASED CELL

(71) Applicant: LG ELECTRONICS INC., Seoul (KR)

(72) Inventors: Jinyup Hwang, Seoul (KR); Changhwan Park, Seoul (KR); Joonkui Ahn, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/470,586

(22) Filed: Mar. 27, 2017

(65) Prior Publication Data

US 2017/0290053 A1 Oct. 5, 2017

Related U.S. Application Data

(60) Provisional application No. 62/372,807, filed on Aug. 10, 2016, provisional application No. 62/316,596, filed on Apr. 1, 2016.

(30) Foreign Application Priority Data

Jan. 11, 2017 (KR) ........................ 10-2017-0004029

(51) Int. Cl.
*H04W 48/18* (2009.01)
*H04W 74/00* (2009.01)
(Continued)

(52) U.S. Cl.
CPC ........ *H04W 74/004* (2013.01); *H04B 7/0626* (2013.01); *H04L 5/00* (2013.01);
(Continued)

(58) Field of Classification Search
CPC ....... H04B 7/0417; H04B 7/0626; H04L 5/00; H04W 28/0231; H04W 28/0268;
(Continued)

(56) References Cited

U.S. PATENT DOCUMENTS

2014/0321407 A1* 10/2014 Seo ...................... H04B 7/0626
370/329
2016/0360437 A1* 12/2016 Larsson ................ H04W 24/10
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 10), 3GPP TS 36.211 V10.4.0. Dec. 2011, 101 pages.

*Primary Examiner* — Asad M Nawaz
*Assistant Examiner* — Zhaohui Yang
(74) *Attorney, Agent, or Firm* — Lee Hong Degerman Kang Waimey

(57) ABSTRACT

Provided is a method for reporting channel status information (CSI) on a license assisted access (LAA) based cell, the method comprising: receiving a configuration of a CSI report; considering that a periodic CSI report is not configured for the LAA based cell although the configuration of the CSI report is received; and if the LAA based cell is configured and if the number of CSI measuring processes is equal to or greater than a predetermined number Ny at a first subframe, not updating measurement for the CSI report at the first subframe.

12 Claims, 15 Drawing Sheets

(51) Int. Cl.
| | |
|---|---|
| H04W 28/24 | (2009.01) |
| H04W 28/02 | (2009.01) |
| H04W 28/18 | (2009.01) |
| H04W 48/12 | (2009.01) |
| H04B 7/06 | (2006.01) |
| H04W 48/00 | (2009.01) |
| H04W 74/04 | (2009.01) |
| H04W 74/08 | (2009.01) |
| H04W 48/20 | (2009.01) |
| H04W 60/00 | (2009.01) |
| H04W 76/10 | (2018.01) |
| H04W 24/10 | (2009.01) |
| H04L 5/00 | (2006.01) |
| H04B 7/0417 | (2017.01) |

(52) U.S. Cl.
CPC ....... *H04W 24/10* (2013.01); *H04W 28/0231* (2013.01); *H04W 28/0268* (2013.01); *H04W 28/0273* (2013.01); *H04W 28/18* (2013.01); *H04W 28/24* (2013.01); *H04W 48/12* (2013.01); *H04W 48/17* (2013.01); *H04W 48/18* (2013.01); *H04W 48/20* (2013.01); *H04W 60/005* (2013.01); *H04W 74/04* (2013.01); *H04W 74/08* (2013.01); *H04W 76/10* (2018.02); *H04B 7/0417* (2013.01); *H04W 74/0808* (2013.01)

(58) Field of Classification Search
CPC . H04W 28/0273; H04W 28/18; H04W 28/24; H04W 48/12; H04W 48/17; H04W 48/18; H04W 48/20; H04W 60/005; H04W 74/004
See application file for complete search history.

(56) References Cited

U.S. PATENT DOCUMENTS

| | | | |
|---|---|---|---|
| 2017/0070905 A1* | 3/2017 | Li | H04W 24/10 |
| 2017/0279583 A1* | 9/2017 | Dinan | H04L 5/0053 |
| 2017/0280339 A1* | 9/2017 | Jeong | H04W 24/10 |
| 2018/0131427 A9* | 5/2018 | Nimbalker | H04B 7/0626 |

* cited by examiner

METHOD FOR REPORTING CHANNEL STATUS INFORMATION ON LICENSE ASSISTED ACCESS BASED CELL

CROSS-REFERENCE TO RELATED APPLICATIONS

Pursuant to 35 U.S.C. § 119, this application claims the benefit of earlier filing date and right of priority to Korean Application No. 10-2017-0004029, filed on Jan. 11, 2017, and also claims the benefit of U.S. Provisional Application Nos. 62/316,596 filed on Apr. 1, 2016 and 62/372,807, filed on Aug. 10, 2016, the contents of which are all incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Meanwhile, as more communication devices require greater communication capacity, there is an important need to efficiently use a limited frequency in the next generation communication system.

In a cellular communication system, an unlicensed band such as a 2.4 GHz band used for an existing IEEE 802.11 system, that is, Wireless Local Area Network (WLAN) system or an unlicensed band such as a 5 GHz band being newly attracting attention is considered to be used in traffic offloading.

The unlicensed band may configure carrier aggregation (CA) with a licensed band to be used. In this way, to use the unlicensed band under support of the licensed band through the CA refers to License Assisted Access (LAA).

A UE should measure and report channel status information (CSI) on an LAA based cell (a cell operating at an unlicensed band based carrier).

Assuming that the maximum number of CSI simultaneous measuring processes is 5 or Ny (the number of aggregation carriers of 6 or greater) during carrier aggregation of a licensed band, when the maximum number of a CSI measuring process is Ny, an existing 3GPP standard reports the Ny to a base station. However, if the LAA base cell is included in the CA, the number of carries in which CSI is simultaneously measured due to a characteristic of the unlicensed band may exceed 5 or Ny which is the number of simultaneous measuring CSI by the UE. Accordingly, the number of CSI measuring processes may be insufficient.

Further, when the unlicensed band is occupied by the IEEE 802.11 system, the LAA based cell cannot transmit a reference signal. In this case, the UE cannot measure the CSI.

SUMMARY OF THE INVENTION

Accordingly, an object of the present invention is to solve the above-mentioned problems.

In order to achieve the above object, there is provided a method for reporting channel status information (CSI) on a license assisted access (LAA) based cell, the method comprising: receiving a configuration of a CSI report; considering that a periodic CSI report is not configured for the LAA based cell although the configuration of the CSI report is received; and if the LAA based cell is configured and if the number of CSI measuring processes is equal to or greater than a predetermined number Ny at a first subframe, not updating measurement for the CSI report at the first subframe.

The LAA based cell may be a cell operating at an unlicensed band based carrier.

The method may further comprise: transmitting the CSI report including a result of measurement which has been performed on a previous subframe of the first subframe.

The transmitting of the CSI report including the result of the measurement which has been performed on the previous subframe may be performed when a valid resource for a reference signal is included on the previous subframe.

The transmitting of the CSI report including the result of the measurement which has been performed on the previous subframe may be performed when the previous subframe is located within a predetermined number from the first subframe.

The CSI report may comprise a value indicating an out of range (OOR) if the previous subframe is spaced apart from the first subframe by more than a predetermined number.

The method may further comprise: omitting the CSI report or transmitting the CSI report including a value indicating an out of range (OOR) when a valid resource of a reference signal is not included on a second subframe where a measurement for the CSI report is to be performed.

When the CSI report is performed at a subframe n, the first subframe where the measurement is to be performed may be a subframe n−x, and a value of the x is received through an upper layer signal from a base station.

There is also provided a user equipment (UE) for reporting channel status information (CSI) on a license assisted access (LAA) based cell, the UE comprising: a transceiver configured to receive a configuration of a CSI report; and a processor configured to consider that a periodic CSI report is not configured for the LAA based cell although the configuration of the CSI report is received. If the LAA based cell is configured and if the number of CSI measuring processes is equal to or greater than a predetermined number Ny at a first subframe, the processor is configured to not update measurement for the CSI report at the first subframe.

According to a disclosure of the present specification, the above problem of a related art is solved.

DESCRIPTION OF EXEMPLARY EMBODIMENTS

Figure 1:
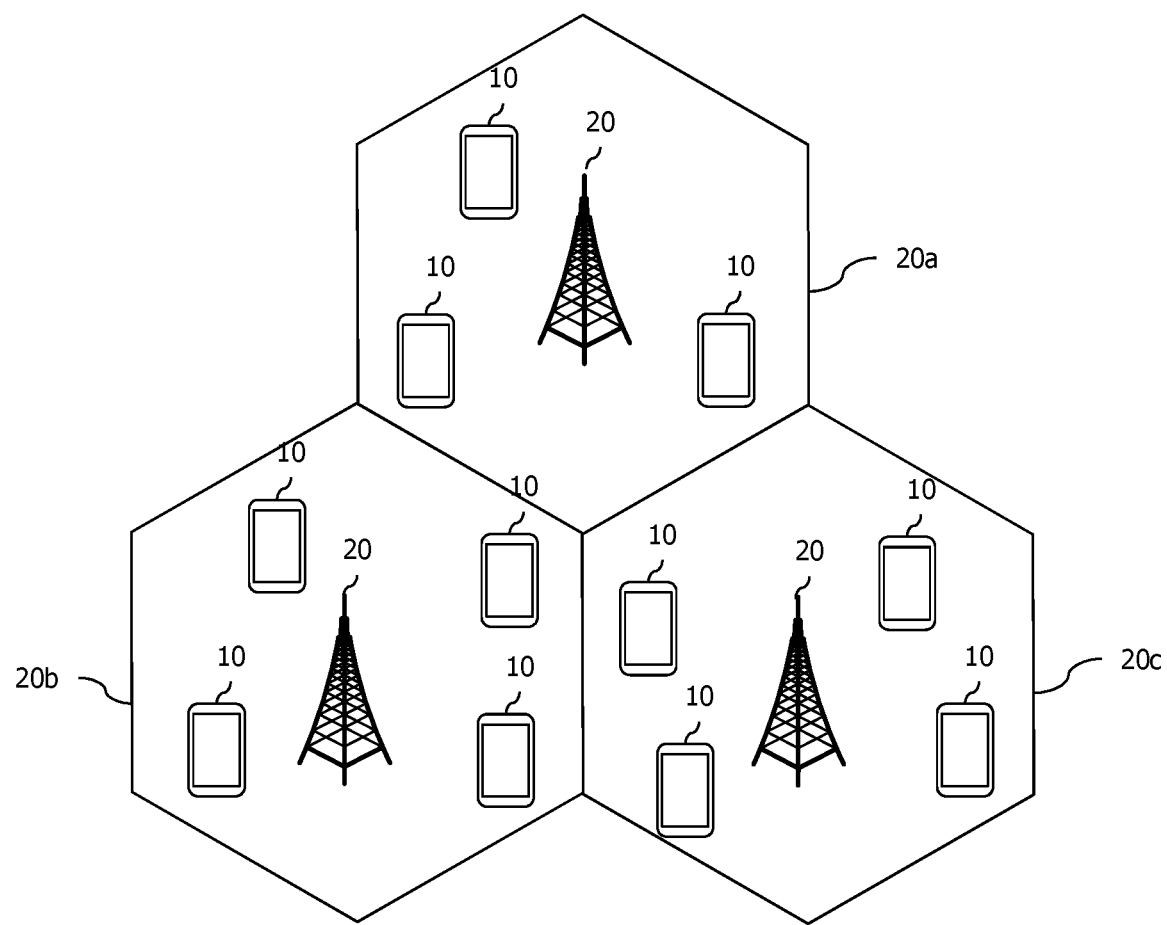
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
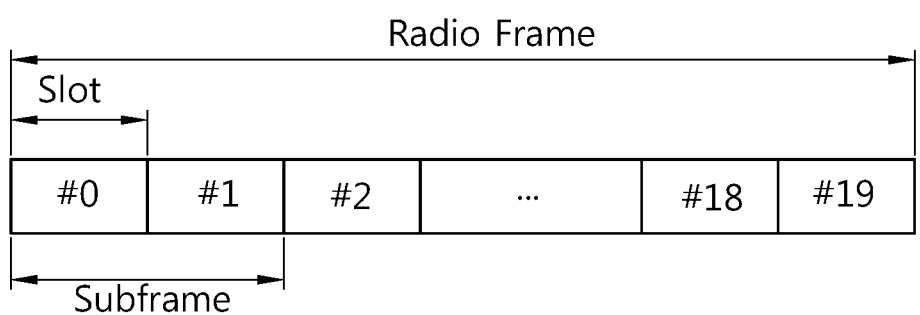
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
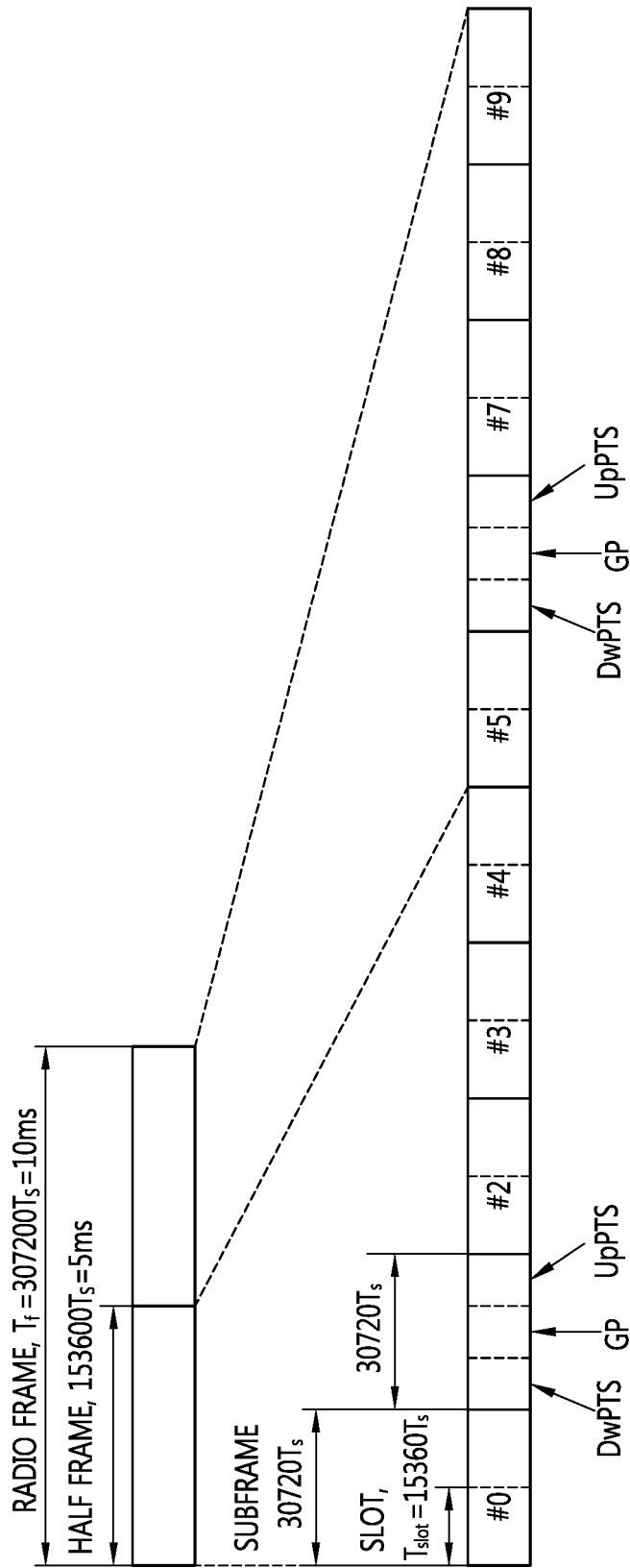
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
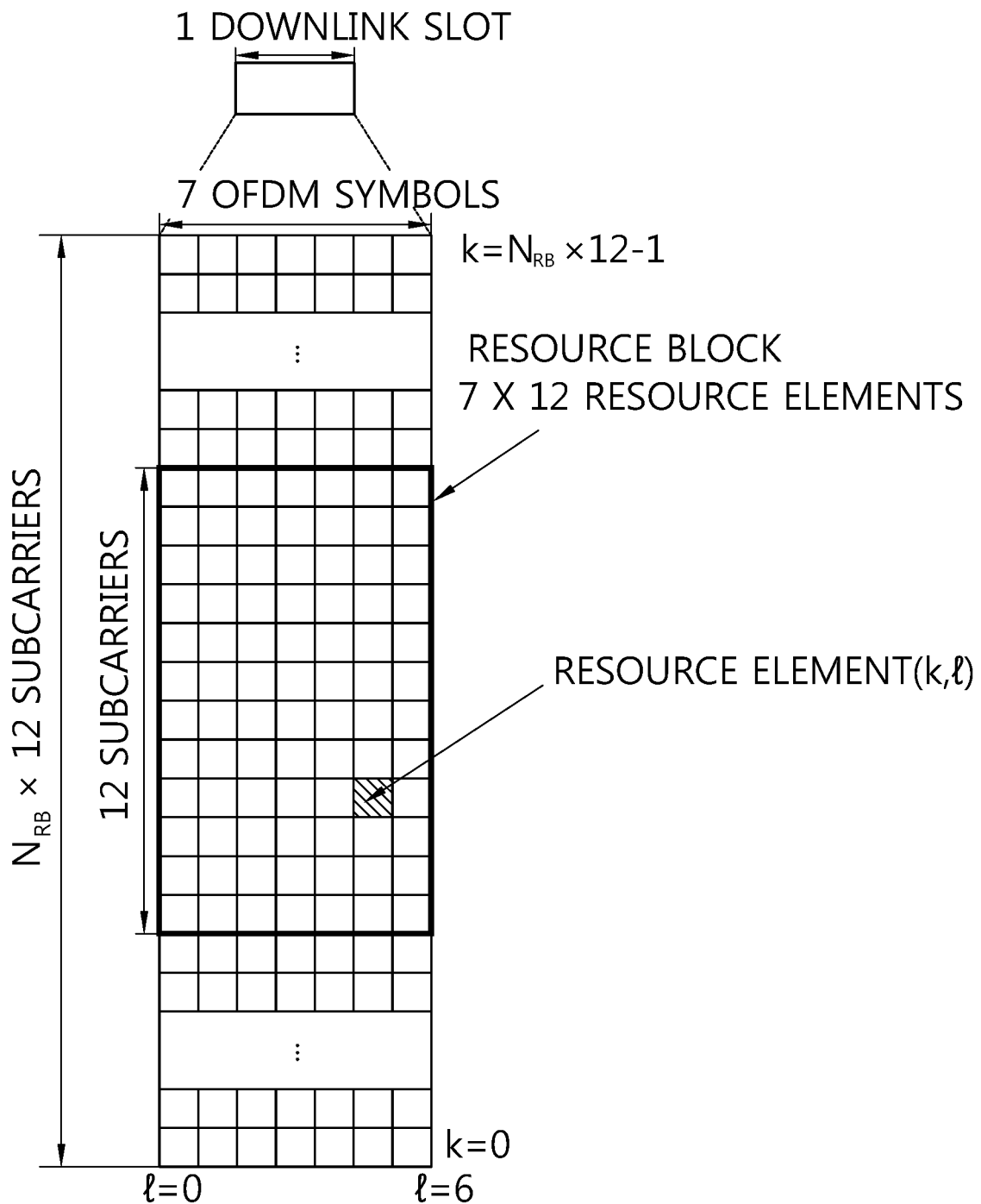
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
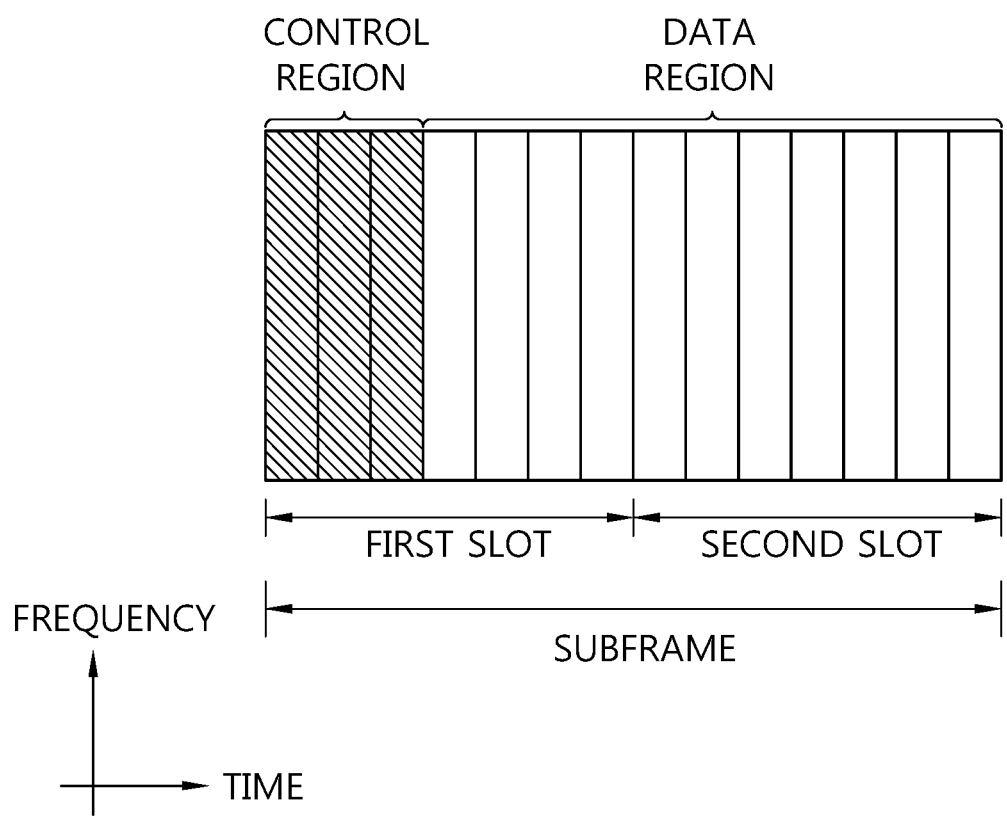
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
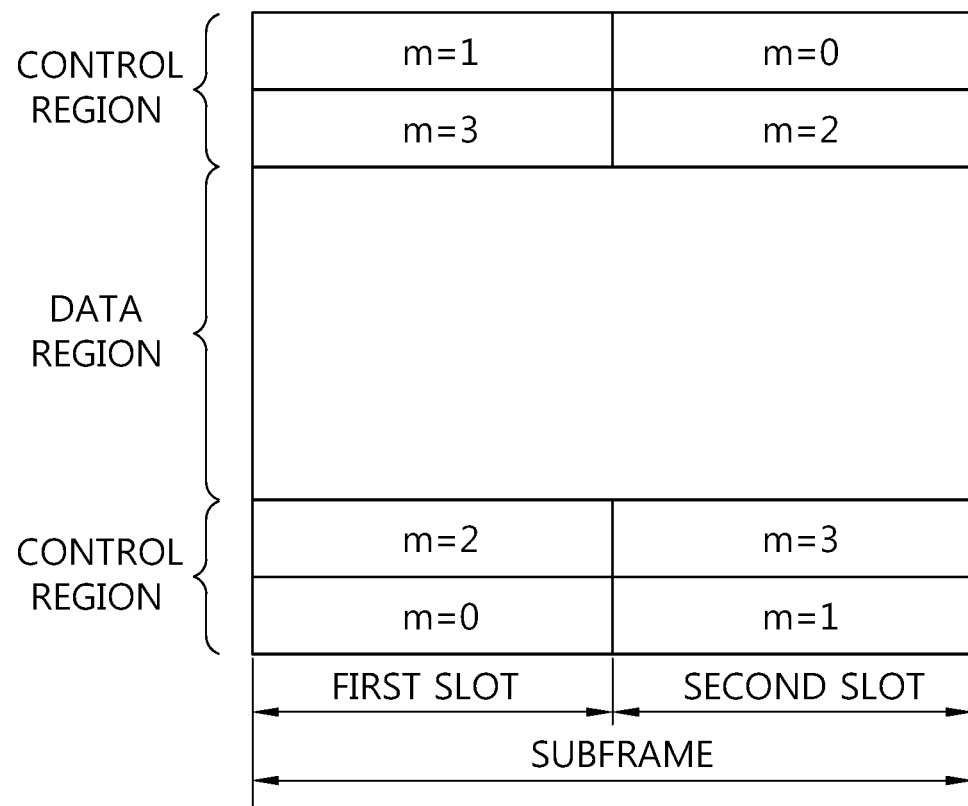
FIG. 6 illustrates a structure of an uplink subframe in 3GPP LTE.
Figure 6:
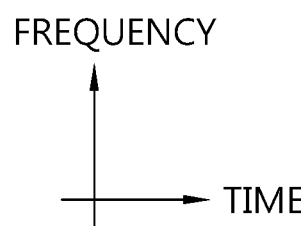

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
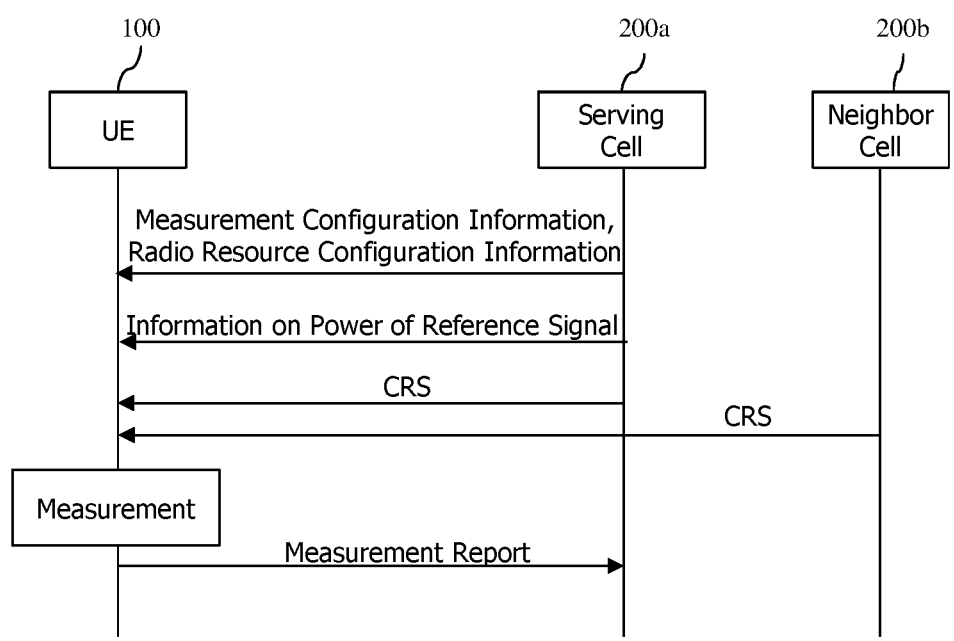
FIG. 7 illustrates a measurement and a measurement report.

FIG. 7 illustrates a measurement and a measurement report.

In wireless communication systems, it is indispensable to support mobility of the UE 100. Accordingly, the UE 100 continuously measures quality for serving cell that currently provides service and quality for a neighbor cell. The UE 100 reports the measurement result to a network on an appropriate time, and the network provides an optimal mobility to the UE through handover, and so on. Commonly, the measurement of such an object is called a radio resource management (RRM) measurement.

As we can know with reference to FIG. 8, if each of the serving cell 200a and the neighbor cell 200b transmit a cell-specific reference signal (CRS) to the UE 100, the UE 100 performs measurement through the CRS, and transmits the measurement result to the serving cell 200a.

In this time, the UE 100 may perform the measurement in the following three methods.

1) RSRP (reference signal received power): This represents an average reception power of all REs that carry the CRS which is transmitted through the whole bands. In this time, instead of the CRS, an average reception power of all REs that carry the CSI RS may also be measured.

2) RSSI (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a subband. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a measurement configuration information element (IE) from the serving cell 100a for the measurement. The message that includes the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. The message that includes the measurement result is called a measurement report message.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Transmission of Channel State Information (CSI)>

Hereinafter, periodic transmission and aperiodic transmission of the CSI will be described.

The CSI as an index indicating a state of a DL channel may include at least any one of a channel quality indicator (CQI) and a precoding matrix indicator (PMI). Further, the CSI may include a precoding type indicator (PTI), a rank indication (RI), and the like.

The CQI provides information on a link adaptive parameter which the UE may support with respective to a given time. The CQI may be generated by various methods. For example, the various methods includes a method that just quantizes and feeds back the channel state, a method that calculates and feeds back a signal to interference plus noise ratio (SINR), a method that announces a state actually applied to the channel, such as a modulation coding scheme (MCS), and the like. When the CQI is generated based on the MCS, the MCS includes a modulation scheme, a coding scheme and the resulting coding rate. In this case, the base station may determine m-phase shift keying (m-PSK) or m-quadrature amplitude modulation (m-QAM) and coding rate by using the CQI. A table given below shows a modulation scheme, code rate, and efficiency depending on a CQI index. The CQI index shown in the table given below may be expressed as 4 bits.

TABLE 3

| CQI index | Modulation | Code rate × 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The PMI provides information on a precoding matrix in precoding a codebook base. The PMI is associated with multiple input multiple output (MIMO). In the MIMO, feed-back of the PMI is called closed loop MIMO.

The RI represents information on the number layers recommended by the UE. That is, the RI represents the number of independent streams used in spatial multiplexing. The RI is fed back only when the UE operates in an MIMO mode using the spatial multiplexing. The RI is continuously associated with one or more CQI feed-backs. That is, the CQI which is fed back is calculated assuming a specific RI value. Since a rank of the channel is generally changed more slowly than the CQI, the RI is fed back at the smaller number of times than the CQI. A transmission period of the RI may be multiple of a transmission period of the CQI/PMI. The RI is given with respect all system bands and frequency selective RI feed-back is not supported.

Figure 8A:
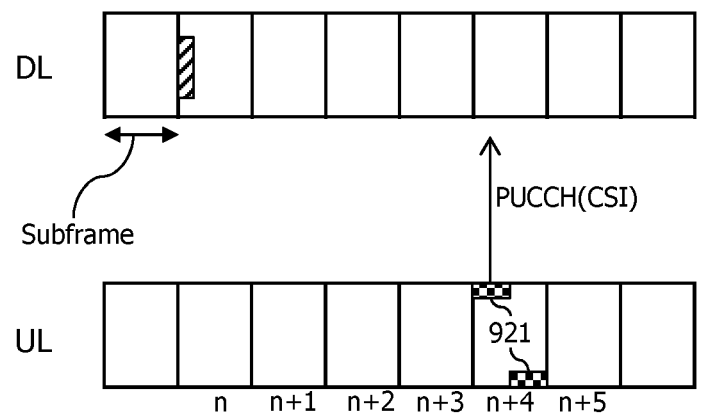
FIG. 8a illustrates one example of periodic CSI reporting in 3GPP LTE.

FIG. 8a illustrates one example of periodic CSI reporting in 3GPP LTE.

As seen with reference to FIG. 8a, the CSI may be periodically transmitted through a PUCCH 921 according to a period determined on a higher layer. That is, the periodic channel state information (CSI) may be transmitted through the PUCCH.

The UE may be semistatically configured by a higher layer signal so as to periodically feed back differential CSIs (CQI, PMI, and RI) through the PUCCH. In this case, the UE transmits the corresponding CSI according to modes defined as shown in a table given below.

TABLE 4

| | | PMI feed-back time | |
|---|---|---|---|
| | | No PMI | Single PMI |
| PUCCH CQI feed-back type | Wideband CQI | Mode 1-0 | Mode 2-0 |
| | Selective subband CQI | Mode 2-0 | Mode 2-1 |

A periodic CSI reporting mode in the PUCCH described below is supported for each transmission mode.

TABLE 5

| Transmission mode | PUCCH CSI reporting modes |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 when PMI/RI reporting is configured for the UE; modes 1-0, 2-0 when the PMI/RI reporting is not configured for the UE |
| Transmission mode 9 | Modes 1-1, 2-1 when the PMI/RI reporting is configured for the UE and the number of CSI-RS ports is larger than 1. modes 1-0, 2-0 when the PMI/RI reporting is not configured for the UE or when the number of CSI-RS ports is 1 |

Meanwhile, a collision of the CSI reports represents a case in which a subframe configured to transmit a first CSI and a subframe configured to transmit a second CSI are the same as each other. When the collision of the CSI reports occurs, the first CSI and the second CSI may be simultaneously transmitted or transmission of a CSI having a lower priority may be dropped (alternatively, abandoned) a CSI having a higher priority may be transmitted according to priorities of the first CSI and the second CSI.

In the case of the CSI report through the PUCCH, various report types may be present as follows according to a transmission combination of the CQI/PMI/RI and period and offset values which are distinguished according to each report type (hereinafter, abbreviated as a type) are supported.

Type 1: Supports the CQI feed-back for a subband selected by the UE.

Type 1a: Supports a subband CQI and a second PMI feed-ack.

Types 2, 2b, 2c: Supports wideband CQI and PMI feed-backs.

Type 2a: Supports the wideband PMI feed-back.

Type 3: Supports an RI feed-back.

Type 4: Transmits a wideband CQI.

Type 5: Supports the RI and wideband PMI feed-back.
Type 6: Supports RI and PTI feed-backs.

Hereinafter, the aperiodic transmission of the CSI will be described.

Figure 8B:
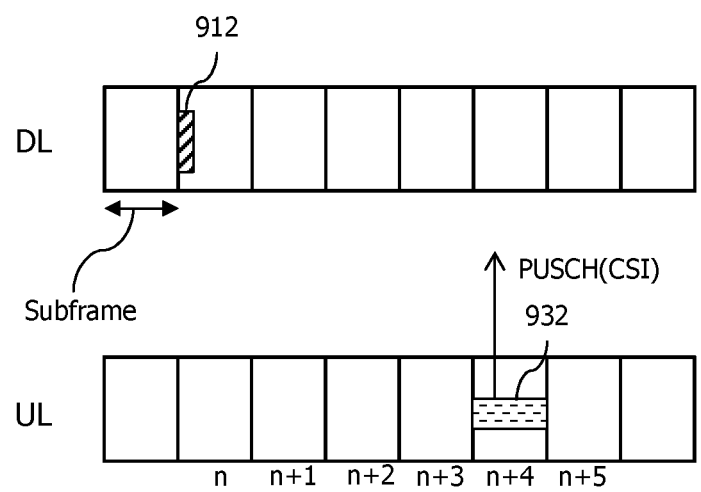
FIG. 8b illustrates one example of aperiodic CSI reporting in the 3GPP LTE.

FIG. 8b illustrates one example of aperiodic CSI reporting in the 3GPP LTE.

A control signal to request the CSI to be transmitted, that is, an aperiodic CSI request signal may be included in a scheduling control signal for the PUSCH transmitted to a PDCCH 912, that is, a UL grant. In this case, the UE aperiodically reports the CSI through a PUSCH 932. As described above, the CSI transmission on the PUSCH is referred to as the aperiodic CSI reporting in that the CSI transmission on the PUSCH is triggered by a request by the base station. The CSI reporting may be triggered by the UL grant or a random access response grant.

In more detail, the wireless device receives the UL grant including scheduling information for the PUSCH 932 to the PDCCH 912 in subframe n. The UL grant may be included in a CQI request field. A table given below shows one example of the CQI request field of 2 bits. A value or a bit count of the CQI request field is just an example.

TABLE 6

| Value of CQI request field | Contents |
| --- | --- |
| 00 | CSI reporting is not triggered |
| 01 | CSI reporting for a serving cell is triggered |
| 10 | CSI reporting for a first set of the serving cell is triggered |
| 11 | CSI reporting for a second set of the serving cell is triggered |

The base station may announce to the wireless device information on the first and second sets for which the CSI reporting is triggered in advance.

When the CSI reporting is triggered, the wireless device transmits the CSI on a PUSCH 620 in subframe n+k. Herein, k=4 or this is just an example.

The base station may designate a reporting mode (reporting mode) of the CSI for the wireless device.

A table given below illustrates one example of the CSI reporting mode in the 3GPP LTE.

TABLE 7

| | PMI feed-back type | | |
| --- | --- | --- | --- |
| | No PMI | Single PMI | Multiple PMI |
| Wideband CQI | | | Mode 1-2 |
| Selective subband CQI | Mode 2-0 | | Mode 2-2 |
| Set subband CQI | Mode 3-0 | Mode 3-1 | |

(1) Mode 1-2

The precoding matrix is selected on the assumption that DL data is transmitted through only the corresponding subband with respect to each subband. The wireless device assumes the precoding matrix selected with respect to a system band or a band (referred to as a band set S) designated by the higher layer signal and generates the CAI (referred to as the wideband CQI).

The wireless device transmits the CSI including the wideband CQI and the PMI of each subband. In this case, the size of each subband may vary depending on the size of the system band.

(2) Mode 2-0

The wireless device selects M subbands preferred with respect to the system band or the band (the band set S) designated by the higher layer signal. The wireless device generates the subband CQI on the assumption that data is transmitted in selected M subbands. The wireless device additionally generates one wideband CQI with respect to the system band or the band set S.

The wireless device transmits information on the selected M subbands, the subband CQI, and the wideband CQI.

(3) Mode 2-2

The wireless device selects M preferred subbands and a single precoding matrix for M preferred subbands on the assumption of transmitting the DL data through M preferred subbands.

The subband CQIs for M preferred subbands are defined for each codeword. The wireless device generates the wideband CQI with respect to the system band or the band set S.

The wireless device transmits the CSI including M preferred subbands, one subband CQI, PMIS for M preferred subbands, the wideband PMI, and the wideband CQI.

(4) Mode 3-0

The wireless device transmits the CSI including the wideband CQI and the subband CQI for the configured subband.

(5) Mode 3-1

The wireless device generates the single precoding matrix with respect to the system band or the band set S. The wireless device assumes the generated single precoding matrix and generates the subband CQI for each codeword. The wireless device may assume the single precoding matrix and generate the wideband CQI.

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 8.

Figure 9:
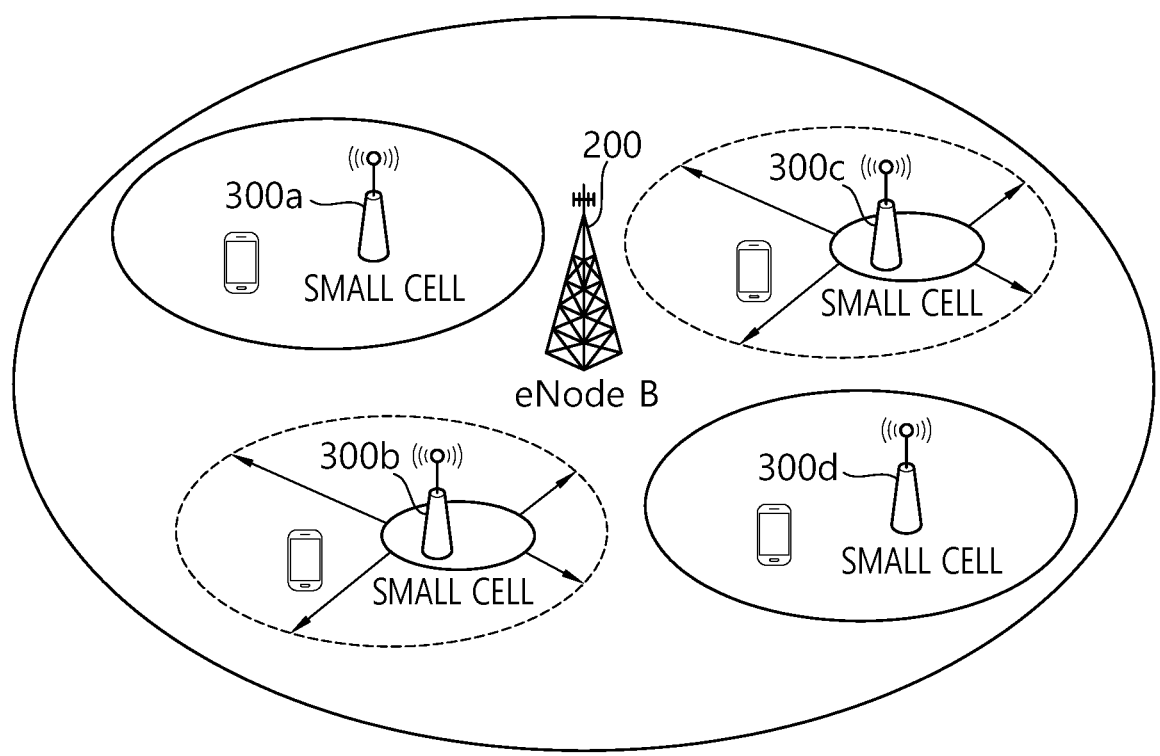
FIG. 9 illustrates a heterogeneous network environment in which a macro cell and a small cell coexist and which is possibly used in a next-generation wireless communication system.

FIG. 9 illustrates a heterogeneous network environment in which a macro cell and a small cell coexist and which is possibly used in a next-generation wireless communication system.

FIG. 9 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell.

Meanwhile, the small cells are placed so that inter-cell interference may be significantly deteriorated. In order to solve the above problem, as shown in drawings, the coverage size of the small cell may be reduced depending on the situation. Alternatively, according to the situation, after the small cell is turned-off, the small cell may be again turned-on.

<LAA (License Assisted Access)>

In recent years, as more communication devices require greater communication capacity, there is an important need to efficiently use a limited frequency in the next generation communication system. In a cellular communication system, an unlicensed band such as a 2.4 GHz band used for an existing IEEE 802.11 system, that is, Wireless Local Area Network (WLAN) system or an unlicensed band such as a 5 GHz band being newly attracting attention is considered to be used in traffic offloading.

Figure 10:
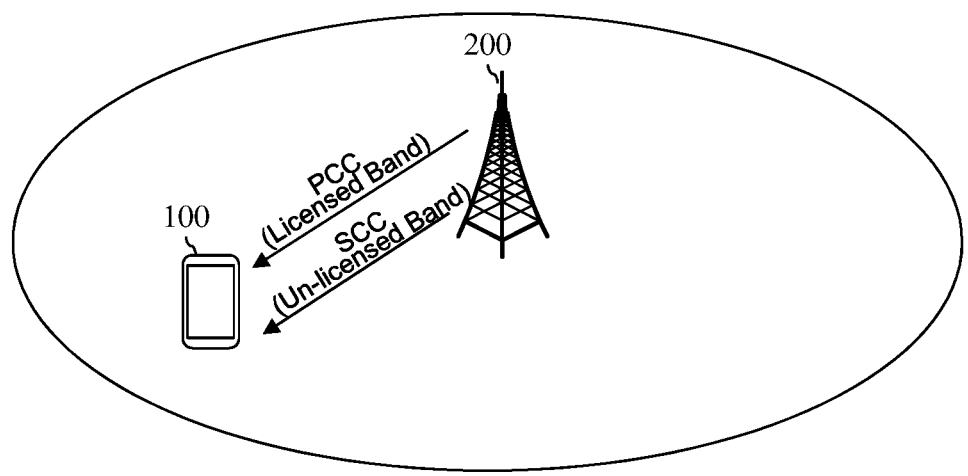
FIG. 10 illustrates an example where a licensed band and an unlicensed band are used as CA.

FIG. 10 illustrates an example where a licensed band and an unlicensed band as CA.

In order to transmit/receive a signal through a carrier wave of an unlicensed band which does not ensure an exclusive use of a specific system, as shown in FIG. 10, a small cell 300 may transmit a signal to the UE 100 or the UE may transmit the signal to the small cell 300 using CA of an LTE-A band being a licensed band and an unlicensed band. In this case, for example, a carrier wave of the licensed band may be integrated as a primary carrier (PCC or may refer to PCell), and a carrier wave of the unlicensed band may be integrated as a secondary carrier (SCC or may refer to SCell). However, the suggested schemes of the present specification may extend to a situation where a plurality of licensed bands and a plurality of unlicensed bands are used as a CA scheme. Further, the suggested schemes of the present specification are applicable to a case where signal transmission and reception are achieved between a base station and UE. Further, the suggested schemes of the present specification are applicable to a system having a different characteristic as well as a 3GPP LTE system.

Meanwhile, as an example of unlicensed band operation operated in a competition based option access scheme, the base station 200 may firstly perform carrier detection (CS) before transmitting/receiving data. As described above, it requires confirming whether another communication node transmits a signal by performing carrier detection before transmission of the data. In the present specification, for the purpose of convenience, a series of operations may refer to a Listening Before Talk (LBT) procedure or a Channel Access Procedure (CAP). In this case, when it is determined that another communication node does not transmit a signal, it may be defined that clear channel assessment (CCA) is confirmed.

Figure 11:
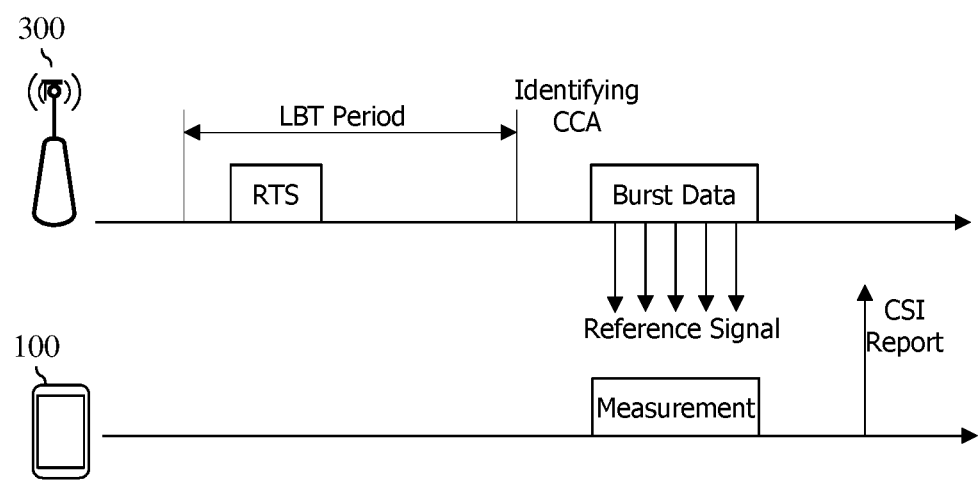
FIG. 11 illustrates an example of transmitting a reference signal on an unlicensed band by a small cell and accordingly an example of performing measurement by UE.

FIG. 11 illustrates an example of transmitting a reference signal on an unlicensed band by a small cell and an example of performing measurement by UE.

As shown in FIG. 11, the small cell 300 operating on the unlicensed band may transmit a reference signal (for example, CRS or search signal) on the unlicensed band.

However, in order to transmit the reference signal (for example, CRS or search signal), the small cell 300 determines whether a neighboring node or another LAA cell based on an IEEE 802.11 system transmits signals through the LBT procedure or the CAP. If it is determined that the signals are not transmitted (that is, determines that a CCA is confirmed), the small cell 300 may transmit burst data and the reference signal reference signal (for example, CRS or CSI-RS).

However, when the CCA is not confirmed because a neighboring node or another node of the IEEE 802.11 system, the small cell 300 cannot transmit the reference signal reference signal (for example, CRS or CSI-RS). In other words, if it is determined that a size of a signal of a neighboring node or a signal of another LAA cell is equal to or greater than a threshold, the small cell cannot transmit the reference signal (for example, CRS or search signal).

Meanwhile, the UE 100 performs measurement based on the reference signal (for example, CRS or CSI-RS) to report Channel State Information (CSI).

<Problems Occurring During Performing Measuring for CSI Report in LAA Environment>

The following description will be made on the assumption that a plurality of licensed band carriers and a plurality of unlicensed band carriers are configured as CA.

First, in the existing 3GPP standard, when performing the measurement report of CSI, the UE cannot average a measuring result on a plurality of subframes. Accordingly, as seen comparing FIG. 12a with FIG. 12b, problems may occur.

Figure 12A:
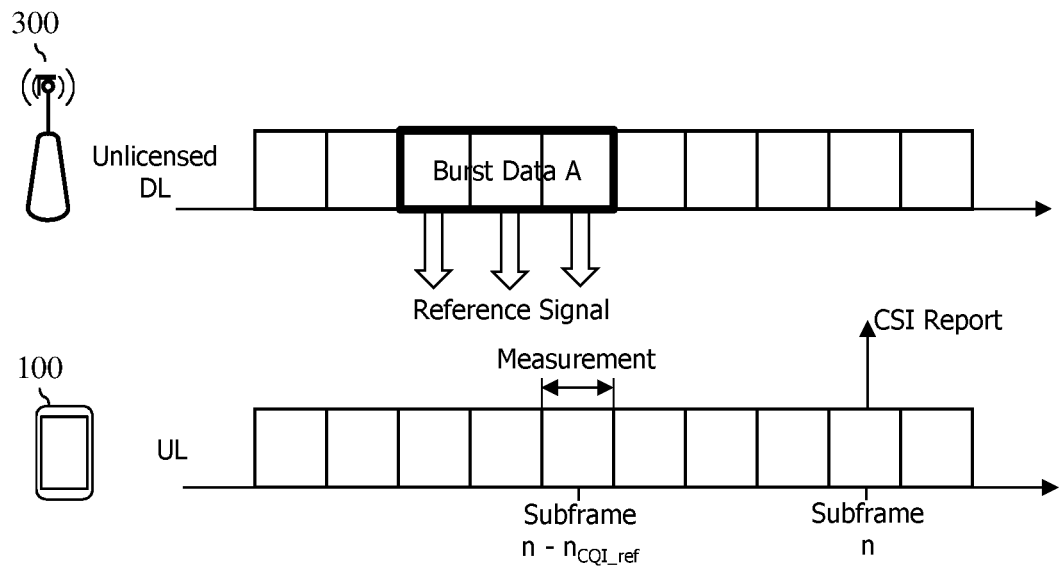
FIG. 12a and FIG. 12b illustrate examples of CSI reporting with respect to a cell using an unlicensed band based carrier.
Figure 12B:
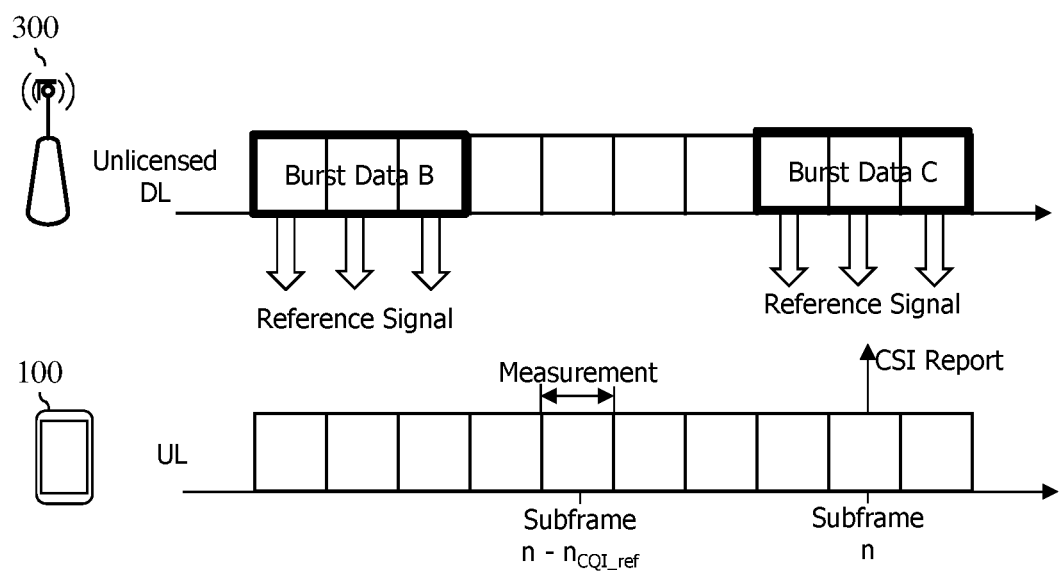

FIG. 12a and FIG. 12b illustrate examples of reporting CSI with respect to a cell using an unlicensed band based carrier.

Referring to FIG. 12a and FIG. 12b, the UE 100 perform CSI report as a subframe n. In this case, the measurement is performed at a subframe $n-n_{CQI\_ref}$. The subframe $n-n_{CQI\_ref}$ is the last valid subframe satisfying nCQI_ref>X (where, X=4 or X=5).

When the CCA is confirmed during the LBT, a cell 300 using an unlicensed band based carrier may transmit the burst data and the reference signal (for example, CRS or CSI-RS).

In this case, as shown in FIG. 12a, when the subframe $n-n_{CQI\_ref}$ for the measurement is included in subframes to which the reference signal (for example, CRS or CSI-RS) are transmitted, the UE 100 may exactly perform the measurement so that there are no problems.

However, as shown in FIG. 12b, when the reference signal is not transmitted on the subframe $n-n_{CQI\_ref}$ for the measurement, the UE 100 cannot perform the measurement.

Such a problem occurs in both of a periodic CSI report and an aperiodic CSI report.

In order to solve the above problem, the UE 100 may perform the measurement on a subframe in which burst data B are received before the subframe $n-n_{CQI\_ref}$ for the measurement to store the measuring result in a buffer. However, since the UE should perform the CSI measurement at all subframes, such a solution causes very great calculation complexity.

Meanwhile, the existing 3GPP standard does not consider where UE receives configuration of at least five CSI processes through upper layer signal with respect to an aperiodic CSI report. Further, in the existing 3GPP standard, when the periodic CSI report collides with the aperiodic CSI report with respect to the same or different carriers, the periodic CSI report is dropped and only the aperiodic CSI report may be transmitted. On the basis of the rule, five CSI measurements are sufficient per TTI regardless of the number of aggregated carriers.

However, when a plurality of licensed band carriers and a plurality of unlicensed band carriers are configured as CA, the total number of carriers may exceed five. Since a reference signal for CSI measurement may not be transmitted according to an LBT result with respect to the unlicensed band, CSI may be measured in all subframes. Accordingly, five Measurement report of CSIs per TTI may not be sufficient. The above will be described with reference to FIG. 13.

Figure 13:
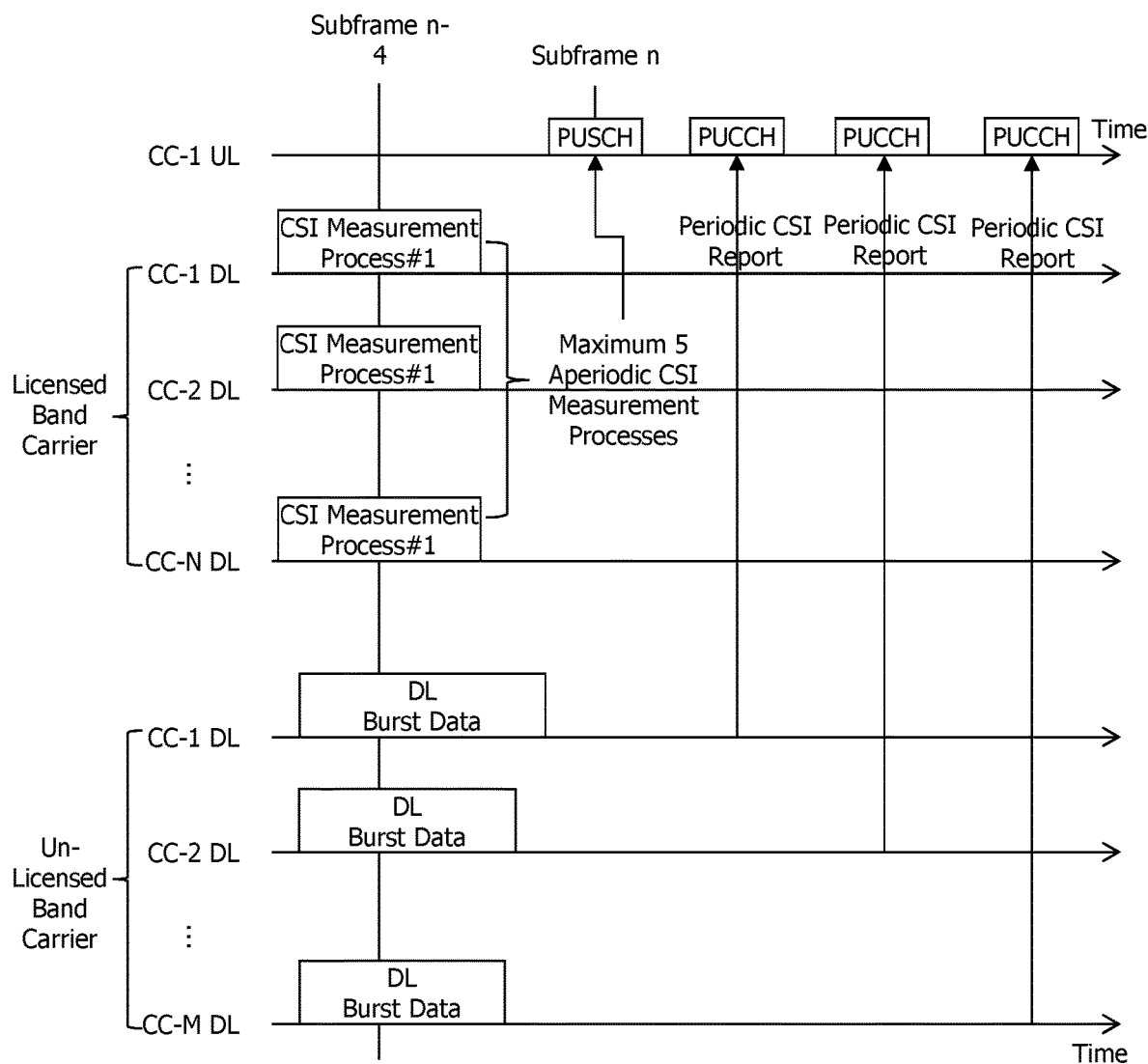
FIG. 13 illustrates an example of performing Measurement report of CSI in a state that a plurality of licensed band carriers and a plurality of unlicensed band carriers are configured as CA.

FIG. 13 illustrates an example of performing Measurement report of CSI in a state that a plurality of licensed band carriers and a plurality of unlicensed band carriers are configured as CA.

Referring to FIG. 13, N licensed band based carriers and M unlicensed band based carriers are aggregated to be configured in the UE. In FIG. 13, it is assumed that the base station configures different CSI report periods with respect to the licensed band based carriers and the unlicensed band based carriers in order to avoid collision between the Measurement report of CSIs. With respect to the licensed band based carriers, the UE performs maximum five CSI measurements from N licensed band based carriers at a subframe n−4, and performs a CSI report at a subframe n. In this case, since the CSI measurement should be performed at a subframe n−4 with respect to the unlicensed band based carrier, there is a need for an additional CSI measuring process. The reason for this is that a corresponding subframe may be the subframe n−4 if measurement should be performed in a subframe in which a DL data burst is received from subframes of the unlicensed band based carrier.

Accordingly, the UE should have M CSI measurement capabilities as well as five CSI measurement capabilities. The above increases implementation complexity of UE and significantly increases consumption of a battery.

As a result, following problems may occur.

Occurrence 1: With respect to a periodic CSI report and an aperiodic CSI report regarding the unlicensed band based carriers, complexity is significantly increased in an implementation aspect of UE.

With respect to a periodic CSI report and an aperiodic CSI report regarding the unlicensed band based carriers, five CSI measuring processes are insufficient in a specific subframe. However, the improvement is achieved to increase the number of CSI measuring processes, complexity is increased and the consumption of the battery is significantly increased.

<Suggestions of the Present Specification>

Accordingly, the present specification suggests following solutions.

1. First Suggestion

In order to reduce implementation complexity of UE and to receive the consumption of the battery, following options are suggested.

1-1. Option 1 of the First Suggestion

UE considers or determines that an LAA cell (that is, a cell operating at an unlicensed band based carrier) is not configured for the periodic CSI report even though the UE receives the periodic CSI report configuration.

An aperiodic CSI report based on cross carrier scheduling (CCS) is configured to be performed in a subframe n.

UE considers a subframe n of the unlicensed band based carrier as a valid subframe.

When the subframe n is not the valid subframe, the UE may report a buffered CSI measuring result after measured at a previous subframe or may transmit a value indicating an "out of range" of table 3 with respect to a CQI.

Option 2 of the First Suggestion

In a state that the licensed band based carriers and the unlicensed band based carriers are aggregated, when UE needs to perform at least five CSI measurements at a specific TTI, the CSI measurement for the licensed band based carriers precedes as compared with the CSI measurement for the unlicensed band based carriers.

Option 3 of the First Suggestion

When there is no valid reference resources for CSI measurement at a subframe n−k (e.g., k=4) with respect to a periodic CSI report and an aperiodic CSI report at a subframe n, a CSI measuring result measured and buffered in a previous subframe (e.g., subframe n−k−i) of the subframe n−k is reported or a value indicating an "out of range" of table 3 with respect to a CQI is transmitted, and measurement may not be performed in the subframe n−k.

Option 4 of the First Suggestion

UE may define capability of the UE with respect to the number of CSI measuring processes which are simultaneously supported.

For example, capability 1 means to support five CSI measuring processes by UE.

For example, capability 2 means to support at least five CSI measuring processes by UE.

2. Second Suggestion

When the number of total CSI measuring processes at a specific subframe including burst data before the nearest time to a time including a resource of the reference signal (e.g., CRS or CSI-RS) for CSI measurement is less than or equal to five, the CSI is measured. Further, CSI measurement is not performed in a different subframe including burst data. UE transmits a result of the CSI measurement at a preset CSI report time. If the CSI measurement is not performed at a subframe including the burst data, the UE transmits a value indicating an "out of range" of table 3 at the CST report time.

Third Suggestion

Due to requirements for CSI measuring process, in a case where burst data more than Ny are received from configured LAA cells (that is, cells operating at an unlicensed band based carrier) or burst data more than Ny are received from configured LAA cells (that is, cells operating at an unlicensed band based carrier)+cells operating a licensed band based carrier, if the UE does not prepare the Measurement report of CSI, the UE transmits a value indicating an "out of range" of table 3 with respect to a partial LAA cell as a CSI report.

Modification of Third Suggestion

Due to requirements for CSI measuring process, in a case where burst data more than Ny are received from configured LAA cells (that is, cells operating at an unlicensed band based carrier) or burst data more than Ny are received from configured LAA cells (that is, cells operating at an unlicensed band based carrier)+cells operating at a licensed band based carrier, if the UE does not prepare the Measurement report of CSI, the UE may measure and report in a different subframe (e.g., subframe n−k−i) which does not satisfy a condition to perform CSI measurement in a final subframe (e.g., subframe n−k) including a valid resource of the reference signal (e.g., CRS or CSI-RS). In this case, the UE may not perform update of the measurement in the subframe n−k. Alternatively, when burst data are received on a different subframe (e.g., subframe n−k−i) which does not satisfy a condition to perform the CSI measurement in a final subframe (e.g., subframe n−k) including a valid resource of the reference signal (e.g, CRS or CSI-RS), the UE may measure and report CSI at a corresponding subframe (e.g., subframe n−k−i). In this case, the UE may not perform the update of measurement at the subframe n−k. In other words, when CSI measuring processes more than Ny are needed in the subframe n−k due to an LAA based cell, the UE does not perform update of measurement at the subframe n−k, and may report a CSI measuring result measured and buffered in a previous subframe n−k−i of the subframe n−k or may transmit a value indicating an "out of range" of table 3 with respect to a CQI.

However, CSI measurement is performed in a subframe to which a CSI report is requested or a previous subframe by X of a subframe to perform a CSI report, in order to prevent an excessive previous CSI result from being reported, the UE transmits a value indicating an "out of range" of table 3 instead of a corresponding CSI measuring result as a CSI report.

Fourth Suggestion

With respect to a CCS based aperiodic CSI measurement, when an aperiodic Measurement report of CSI with respect to an LAA cell (that is, a cell operating at an unlicensed band based carrier) is requested to be performed in a subframe n, the UE assumes that a valid resource of a reference signal for CSI measurement is included on a subframe n or from a subframe n−x to a subframe n. In this case, the x is set through an upper layer signal from a base station. When the above assumption is not satisfied, the UE may transmit a value indicating an "out of range" of table 3 as an aperiodic CSI report or may omit the aperiodic CSI report.

Figure 14:
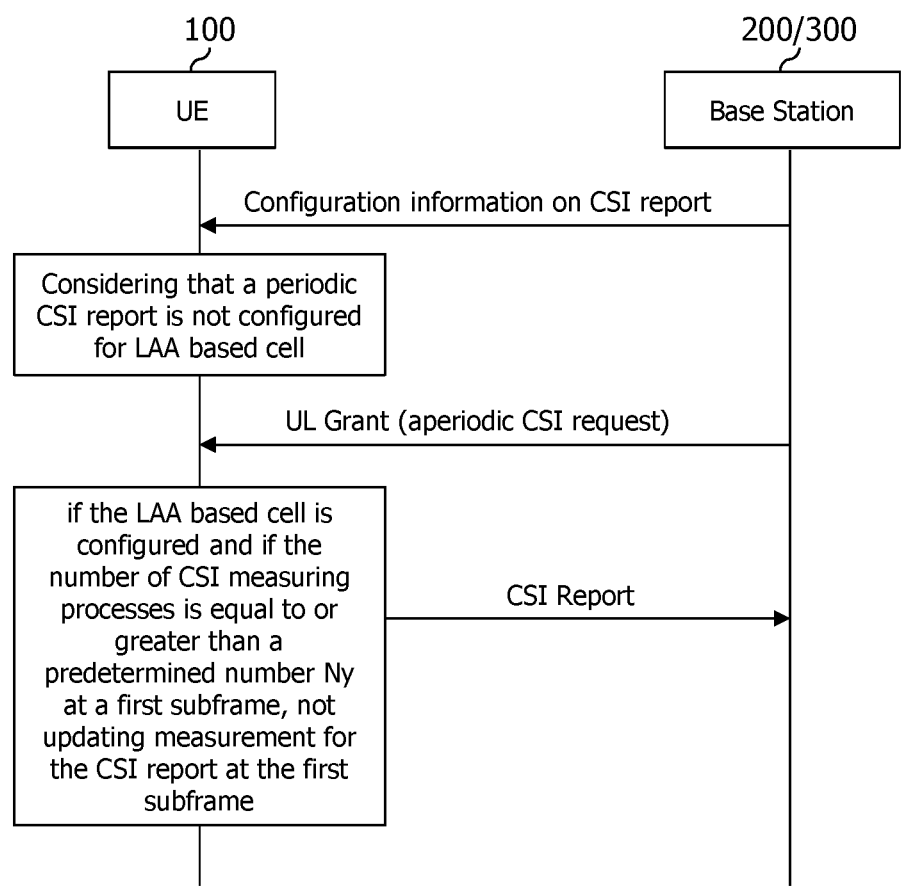
FIG. 14 is a flowchart schematically illustrating suggestions according to the present specification.

FIG. 14 is a flowchart schematically illustrating suggestions according to the present specification.

Referring to FIG. 14, the UE 100 receives a Measurement report of CSI configuration. The Measurement report of CSI configuration may include a report mode described with reference to FIG. 8a and FIG. 8b and information on first and second groups in which a CSI report is triggered.

The UE 100 may regard that a periodic CSI report is not configured based on the CSI report configuration.

Meanwhile, the UE 100 receives a UL grant including a request for an aperiodic Measurement report of CSI with respect to the LAA based cell.

In a case where the CSI measurement with respect to an LAA based cell is performed at a first subframe according to the request, if the number of CSI measurement processes in the first subframe is equal to or greater than a predetermined number Ny, the UE may not perform measurement for the CSI report.

Alternatively, the UE may transmit a measurement report of CSI including a CSI measurement result performed at a previous subframe of the first subframe. As described above, when a valid resource of the reference signal is included on the previous subframe, the measurement report of CSI including a CSI measurement result performed on the previous subframe may be transmitted. Further, when the previous subframe is located within a predetermined number from the first subframe, the measurement report of CSI including a CSI measurement result performed on the previous subframe may be transmitted. Meanwhile, when the previous subframe is spaced apart from the first subframe by a predetermined number of greater, the transmitted Measurement report of CSI may include a value indicating an out of range (OOR).

Meanwhile, in order to perform CSI measurement on the second subframe, when a valid resource of the reference signal is not included on the second subframe, the UE may omit the measurement report of CSI or may transmit the measurement report of CSI including a value indicating an out of range (OOR).

Meanwhile, when the Measurement report of CSI is performed at a subframe n, a first subframe performing the CSI measurement is a subframe n−x, and a value of the x may be received through upper layer signal from a base station.

The embodiments of the present invention may be implemented by various means. For example, the embodiments of the present invention may be implemented by hardware, firmware, software, or a combination thereof. A detailed description will be given with reference the accompanying drawings.

Figure 15:
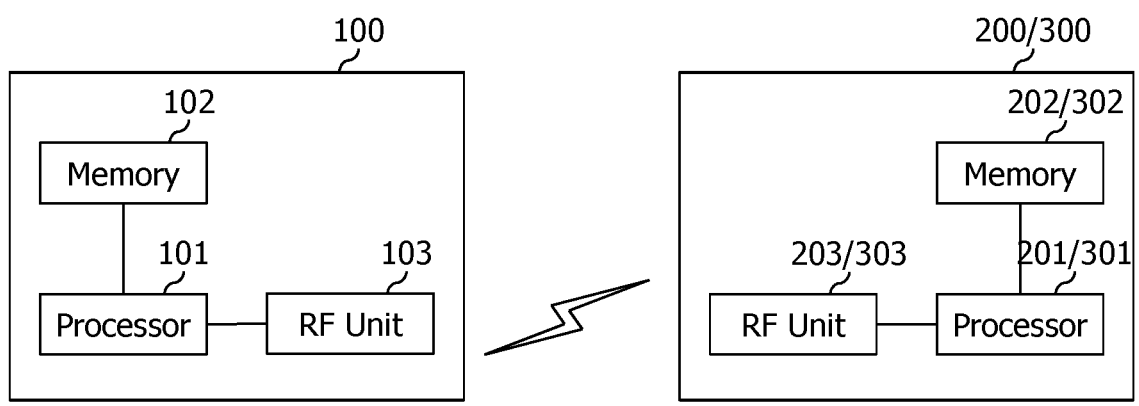
FIG. 15 is a block diagram illustrating a wireless communication system according to a disclosure of the present specification.

FIG. 15 is a block diagram illustrating a wireless device according to an embodiment of the present invention.

A base station 200/300 includes a processor 201/301, a memory 202/302, and an RF unit 203/303. The memory 202/302 is connected to the processor 201/301 and stores various information to drive the processor 201/301. The RF unit 203/303 is connected to the processor 201/301 and sends and receives radio signals. The processor 201/301 performs the proposed functions, processes and/or methods. In the above embodiment, an operation of the base station may be implemented by the processor 201/301.

The UE 100 includes a processor 101, a memory 102, and an RF unit 103. The memory 102 is connected to the processor 101 and stores various information to drive the processor 101. The RF unit 103 is connected to the processor 101 and sends and receives radio signals. The processor 101 performs the proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting channel status information (CSI) on a license assisted access (LAA) based cell operating at an unlicensed band, the method comprising:
   receiving a configuration of a CSI report;
   based on (i) that a periodic CSI report is not configured for the LAA based cell although the configuration of the CSI report is received, (ii) that the LAA based cell operating at the unlicensed band is configured, and (iii) that the number of CSI measuring processes is equal to or greater than a predetermined number Ny at a first subframe:
      not updating measurement for the CSI report at the first subframe; and
      transmitting the CSI report including a previous result of measurement which has been previously performed on a subframe previous to the first subframe on which the measurement has not been updated,
   wherein the subframe, on which the measurement has been previously performed and then the previous result of the measurement has been acquired, is a subframe of a licensed band, but not a subframe of the unlicensed band.

2. The method of claim 1, wherein the LAA based cell is a cell operating at an unlicensed band based carrier.

3. The method of claim 1, wherein the measurement is performed on the subframe if a valid resource for a reference signal is included on subframe.

4. The method of claim 3, wherein the CSI report comprises a value indicating an out of range (OOR) if the subframe is spaced apart from the first subframe by more than a predetermined number.

5. The method of claim 1, wherein the CSI report is transmitted when the subframe is located within a predetermined number from the first subframe.

6. The method of claim 1, further comprising
omitting the CSI report or transmitting the CSI report including a value indicating an out of range (OOR) when a valid resource of a reference signal is not included on a second subframe where a measurement for the CSI report is to be performed.

7. The method of claim 1, wherein when the CSI report is performed at a subframe n, the first subframe where the measurement is to be performed is a subframe n−x, and a value of the x is received through an upper layer signal from a base station.

8. A user equipment (UE) for reporting channel status information (CSI) on a license assisted access (LAA) based cell operating at an unlicensed band, the UE comprising:
a transceiver configured to receive a configuration of a CSI report; and
a processor,
wherein based on (i) that a periodic CSI report is not configured for the LAA based cell although the configuration of the CSI report is received, (ii) that the LAA based cell operating at the unlicensed band is configured, and (iii) that the number of CSI measuring processes is equal to or greater than a predetermined number Ny at a first subframe, the processor is configured to:
not update measurement for the CSI report at the first subframe, and
transmit the CSI report including a previous result of measurement which has been previously performed on a subframe previous to the first subframe on which the measurement has not been updated,
wherein the subframe, on which the measurement has been previously performed and then the previous result of the measurement has been acquired, is a subframe of a licensed band, but not a subframe of the unlicensed band.

9. The UE of claim 8, wherein the LAA based cell is a cell operating at an unlicensed band based carrier.

10. The UE of claim 8, wherein the measurement is performed on the subframe if a valid resource for a reference signal is included on the subframe.

11. The UE of claim 10, wherein the CSI report comprises a value indicating an out of range (OOR) if the subframe is spaced apart from the first subframe by more than a predetermined number.

12. The UE of claim 8, wherein the CSI report is transmitted when the subframe is located within a predetermined number from the first subframe.

* * * * *